United States Patent
Tanaka et al.

(10) Patent No.: US 8,057,209 B2
(45) Date of Patent: Nov. 15, 2011

(54) MOLD FOR INJECTION MOLDING APPARATUS

(75) Inventors: Hidehisa Tanaka, Numazu (JP); Jyun Koike, Suntou-gun (JP); Yukio Iimura, Suntou-gun (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 96 days.

(21) Appl. No.: 11/851,478

(22) Filed: Sep. 7, 2007

(65) Prior Publication Data
US 2008/0061478 A1 Mar. 13, 2008

(30) Foreign Application Priority Data
Sep. 8, 2006 (JP) ................................ 2006-244478

(51) Int. Cl.
*B29B 13/08* (2006.01)
(52) U.S. Cl. ..................... 425/174.4; 425/543
(58) Field of Classification Search .................. 425/174, 425/542, 174.4, 543; 264/328.1
See application file for complete search history.

(56) References Cited

U.S. PATENT DOCUMENTS

| | | | | |
|---|---|---|---|---|
| 3,196,485 | A * | 7/1965 | Battenfeld et al. | 425/408 |
| 4,846,651 | A * | 7/1989 | Matsuda et al. | 425/145 |
| 4,992,036 | A * | 2/1991 | Herdtner et al. | 425/135 |
| 5,171,585 | A * | 12/1992 | Onisawa et al. | 425/192 R |
| 5,468,315 | A * | 11/1995 | Okada et al. | 156/64 |
| 6,616,863 | B1 | 9/2003 | Gotoh et al. | |
| 6,863,515 | B2 * | 3/2005 | Nakamichi et al. | 425/116 |
| 7,204,683 | B2 | 4/2007 | Shibata et al. | |
| 2002/0145232 | A1 | 10/2002 | Zettel et al. | |
| 2004/0146596 | A1 * | 7/2004 | Shibata et al. | 425/116 |
| 2004/0245677 | A1 * | 12/2004 | Marple et al. | 264/496 |
| 2005/0238757 | A1 * | 10/2005 | Niewels et al. | 425/556 |

FOREIGN PATENT DOCUMENTS

| | | |
|---|---|---|
| CN | 1064438 | 9/1992 |
| CN | 1464983 | 12/2003 |
| DE | 19705303 | 1/1998 |
| DE | 69923847 | 1/2006 |
| JP | 11-179739 | 7/1999 |

OTHER PUBLICATIONS

German Office Action issued in Application No. 102007042755.9-16 dated Nov. 5, 2008.
English translation of German Office Action issued in Application No. 102007042755.9-16 dated Nov. 5, 2008.
English Language translation of JP11-179739.
English Language Abstract for JP11-179739.
Office Action issued in Chinese Application 200710153648.2 on Jun. 19, 2009.
English Language Translation of Office Action issued in Chinese Application 200710153648.2 on Jun. 19, 2009.
English Language Abstract of CN 1064438 published Sep. 16, 1992.
English Language Abstract of DE 19705303 published Jan. 22, 1998.

\* cited by examiner

*Primary Examiner* — Khanh P Nguyen
*Assistant Examiner* — Vishal I Patel
(74) *Attorney, Agent, or Firm* — DLA Piper LLP US

(57) ABSTRACT

A mold for an injection molding apparatus includes a light-transmitting part forming at least a portion of the mold, and configured to transmit light to a cavity to be filled with photo-setting resin.

6 Claims, 5 Drawing Sheets

MOLD FOR INJECTION MOLDING APPARATUS

CROSS-REFERENCE TO RELATED APPLICATIONS

This application is based upon and claims the benefit of priority from prior Japanese Patent Application No. 2006-244478, filed Sep. 8, 2006, the entire contents of which are incorporated herein by reference.

BACKGROUND OF THE INVENTION

1. Field of the Invention

The present invention relates to a mold used for an injection molding apparatuses.

2. Description of the Related Art

Jpn. Pat. Appln. KOKAI Pub. No. 11-179739 discloses an injection molding apparatus. The apparatus is aimed at performing molding of synthetic resin at normal temperature and low pressure, and performs setting-molding by applying light to photo-setting resin filled into a cavity of a mold. Specifically, at least a portion of the mold is formed of a light-transmitting material, and light from an external light source or a light source incorporated in the light-transmitting material passes through the mold and is applied to the photo-setting resin in the cavity. In particular, if the mold is required to have a sufficient strength or a used light-transmitting material is expensive, the mold is formed of an external mold and an internal mold, and only the internal mold is formed of light-transmitting material.

In the injection molding apparatus, a large clamp force is not loaded on the mold, and it is difficult to obtain fine and precise molded products.

BRIEF SUMMARY OF THE INVENTION

An object of the present invention is to provide a mold for an injection molding apparatuses to enable obtaining of a precise molded product.

In an aspect of the present invention, a mold for an injection molding apparatus includes a light-transmitting part forming at least a portion of the mold, and configured to transmit light to a cavity to be filled with photo-setting resin.

In another aspect of the present invention, an injection molding apparatus includes a mold for an injection molding apparatus, the mold including a light-transmitting part forming at least a portion of the mold, and configured to transmit light to a cavity to be filled with photo-setting resin; a screw or plunger to inject the photo-setting resin into the mold; and a dispenser to supply the photo-setting resin to the screw or plunger.

In another aspect of the present invention, an injection molding method uses an injection molding apparatus, wherein the injection molding apparatus includes: a mold for the injection molding apparatus, the mold including a light-transmitting part forming at least a portion of the mold, and configured to transmit light to a cavity to be filled with photo-setting resin; a screw or plunger to inject the photo-setting resin into the mold; and a dispenser to supply the photo-setting resin to the screw or plunger.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A first embodiment of the present invention is explained below with reference to FIGS. 1A and 1B.

Figure 1A:
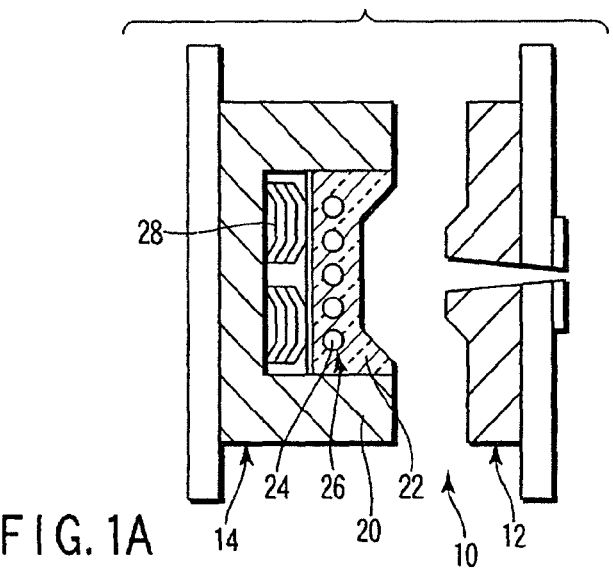
FIG. 1A is a transverse cross-sectional view showing a mold for an injection molding apparatus according to a first embodiment of the present invention, with the mold being opened.
Figure 1B:
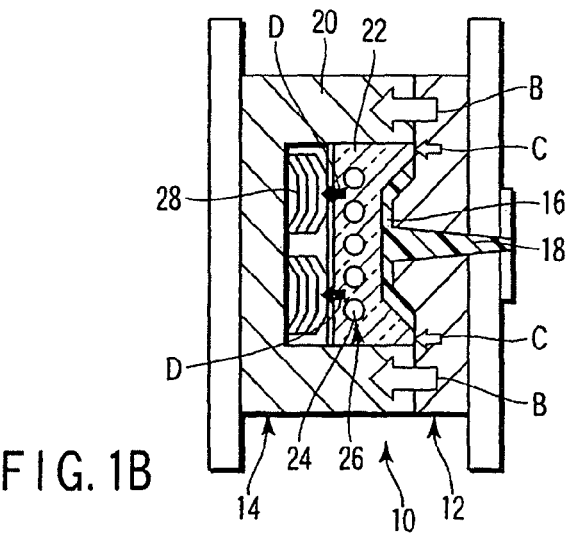
FIG. 1B is a transverse cross-sectional view showing the mold for the injection molding apparatus according to the first embodiment of the present invention, with the mold being closed.

As illustrated in FIGS. 1A and 1B, a mold 10 for an injection molding apparatus according to this embodiment is a mold 10 for horizontal injection molding apparatuses, and is formed of a right mold 12 and a left mold 14. With the right mold 12 and the left mold 14 being closed, a cavity 16 forming an outside shape of a molded product is formed between the right mold 12 and the left mold 14. The right mold 12 is provided with a runner 18 to inject photo-setting resin into the cavity 16.

The left mold 14 is formed of a reinforcing part 20 serving as an external mold, and a light-transmitting part 22 serving as an internal mold. The reinforcing part 20 is formed of a relatively strong material used for a common mold for an injection molding apparatus. On the other hand, the light-transmitting part 22 is formed of a material to transmit light to setting photo-setting resin, such as SUPRASIL, molten quartz, PYREX (registered trademark) glass, and borosilicate crown glass. Further, a light source unit 26 formed of a plurality of light sources 24 is incorporated in the light-transmitting part 22. Examples of the light sources 24 are lightemitting diodes (hereinafter referred to as LEDs), laser diodes, fluorescent lamps, UV lamps, and infrared lamps.

In a surface of the reinforcing part 20 facing the right mold 12, the peripheral portion is pressed against the right mold 12 with the mold being closed, and a depressed portion is formed in the central portion of the surface. The light-transmitting part 22 is contained in the depressed portion such that the light-transmitting part 22 is slidable in the opening/closing direction of the mold. With the mold being closed, the peripheral portion of the surface of the light-transmitting part 22 facing the right mold 12 is pressed against the right mold 12, and the central portion of the surface defines the cavity 16. Through light emission of the light unit 26 in the light-transmitting part 22, light is applied to the cavity 16 through the light-transmitting part 22. Further, a load deformation part 28 is interposed between the bottom portion of the depressed portion of the reinforcing part 20 and the light-transmitting part 22. The load deformation part 28 supports the light-transmitting part 22 to relieve the clamp force loaded on the light-transmitting part 22 when the mold is closed, through its compressive deformation. The load deformation part 28 is formed of a coil spring, a Belleville spring, a hydraulic or Pneumatic cylinder and others.

Next, an injection molding method using the mold 10 for an injection molding apparatus according to this embodiment is explained.

In the injection molding method, the right mold 12 and the left mold 14 is closed and clamped, and a relatively large clamp force is applied on the mold 10. In this time, as illustrated by arrows B in FIG. 1B, most of the clamp force acts between the right mold 12 and the reinforcing part 20 of the left mold 14. Further, as illustrated by arrows C in FIG. 1B, only part of the clamp force acts between the right mold 12 and the light-transmitting part 22 of the left mold 14. In this case, as illustrated by arrows D in FIG. 1B, the clamp force loaded on the light-transmitting part 22 is relieved through compressive deformation of the load deformation part 28, and thus large load is not applied on the light-transmitting part 22. Thereafter, photo-setting resin is injected into the cavity 16 through the runner 18 of the right mold 12. Then, light is emitted from the light source unit 26. The light from the light source unit 26 passes through the light-transmitting part 22, and is applied to the photo-setting resin in the cavity 16. Thereby, the photo-setting resin is set. After the photo-setting resin is completely set to be molded, the mold is opened and a molded product is taken out of the mold.

Since light generated by LEDs has high directivity, in the case where LEDs are used as the light sources 24, it is preferable to diffuse light by using, e.g. a diffusion filter to prevent setting of only a specific portion of the photo-setting resin in the cavity.

The above injection molding method can be performed at normal temperature, and is suitable for insert molding wherein heat-sensitive semiconductor devices such as IC tags are inserted.

Therefore, the mold 10 for an injection molding apparatus according to this embodiment has the following effects.

In the mold 10 for an injection molding apparatus according to this embodiment, fine molded product is obtained through molding with a relatively large clamp force.

Further, when the mold is closed, the clamp force loaded on the light-transmitting part 22 is relieved through the compressive deformation of the load deformation part 28, and thereby damage to the light-transmitting part 22 relatively sensitive to load is prevented.

Further, since the light source unit 26 is incorporated in the mold 10, it is unnecessary to introduce light from the exterior of the mold 10. Therefore, the right mold 12 and the reinforcing part 20 forming the external part of left mold 14 can be formed of an ordinary material for mold, not a light-transmitting material, and thus the strength of the mold 10 is increased.

Figure 2:
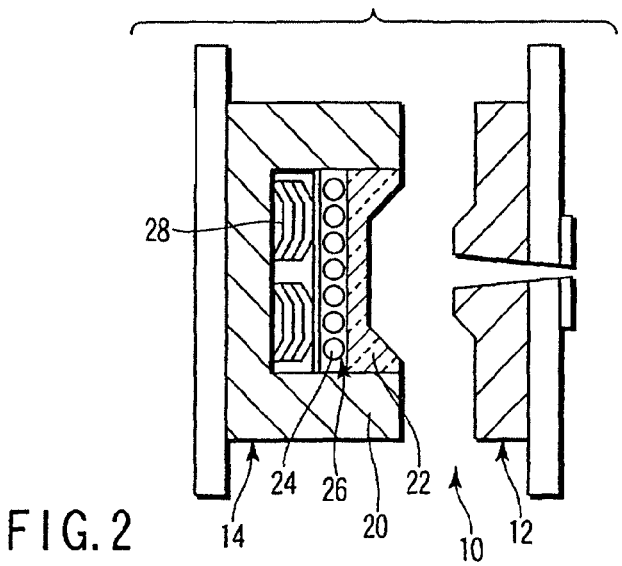
FIG. 2 is a transverse cross-sectional view showing a mold for an injection molding apparatus according to a second embodiment of the present invention, with the mold being opened.

FIG. 2 illustrates a second embodiment of the present invention. Constituent elements having the same functions as those in the first embodiment are denoted by the same respective reference numbers, and explanation thereof is omitted.

As illustrated in FIG. 2, a light source unit 26 according to this embodiment is incorporated in the mold 10 as a member separate from the light-transmitting element 22. Specifically, the light source unit 26 is disposed on a side of the light-transmitting part 22 opposite to the cavity, and between the light-transmitting part 22 and the reinforcing part 20.

In this embodiment, the structure of the light-transmitting part 22 is simplified in comparison with the first embodiment wherein the light source unit 26 is incorporated in the light-transmitting part 22. Further, when the light source unit 26 goes wrong, only the light source unit 26 can be easily changed.

Figure 3:
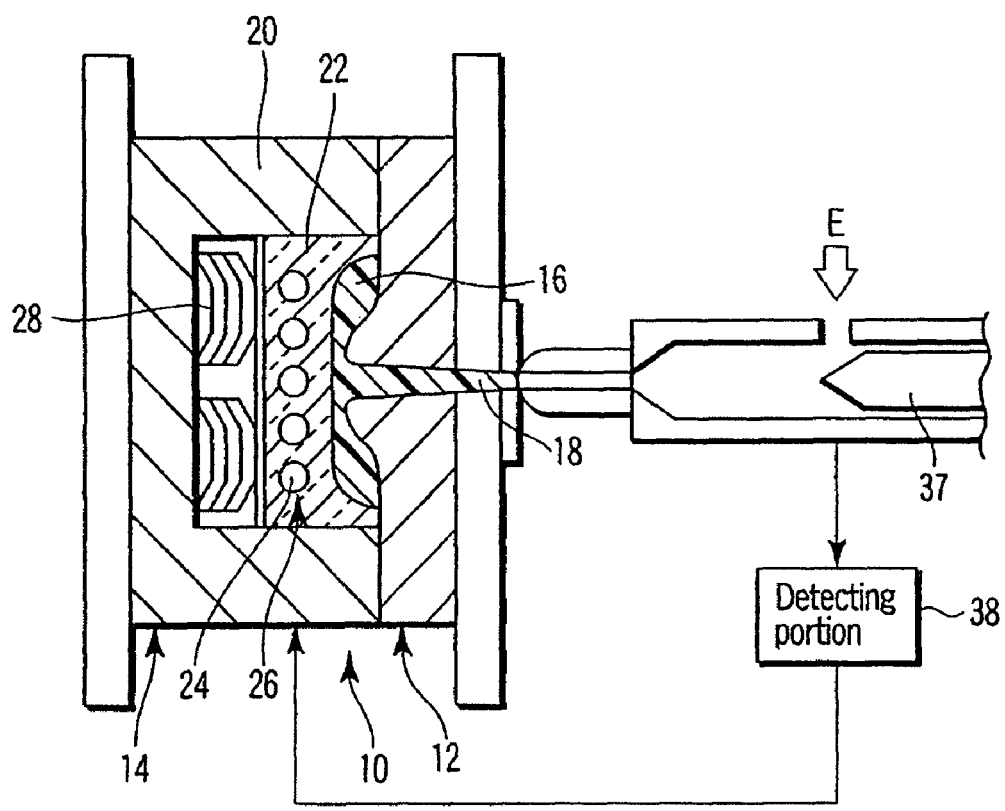
FIG. 3 is a transverse cross-sectional view showing an injection molding apparatus according to a third embodiment of the present invention.
Figure 4:
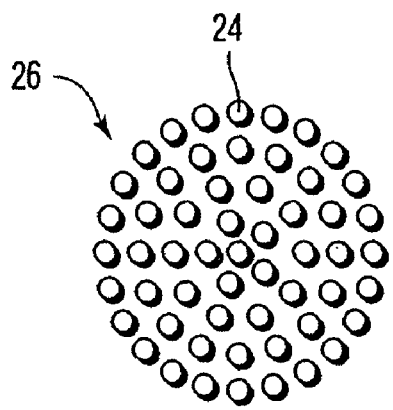
FIG. 4 is a top view showing a light source unit of the injection molding apparatus according to the third embodiment of the present invention.

FIGS. 3 and 4 illustrate a third embodiment of the present invention. Constituent elements having the same functions as those in the first embodiment are denoted by the same respective reference numbers, and explanation thereof is omitted.

As illustrated in FIG. 3, in the mold 10 for an injection mold apparatus according to the third embodiment, the runner 18 is provided in the central portion of the right mold 12 and extends in the opening/closing direction, that is, the horizontal direction of the mold 10. Further, a molded product molded by the mold 10 includes a central portion having a sufficiently thin shape. Accordingly, a cavity 16 has a sufficiently thin shape in the central portion close to the outlet of the runner 18.

A light source unit 26 of the mold 10 is formed by gathering a number of LEDs serving as light sources 24. Each of the LEDs can be turned on and off at a desired timing. In particular, in the light source unit 26 according to this embodiment, as illustrated in FIGS. 3 and 4, an annular LED line is formed of a number of LEDs arranged in an annular shape about a position facing the runner 18, and a number of annular LED lines are concentrically arranged. The light source unit 26 is disposed to face the whole cavity 16.

As illustrated in FIG. 3, the injection molding apparatus including a screw or plunger 37 to inject supplied photo-setting resin into the mold 10. Further, the injection molding apparatus includes a detecting portion or detector 38 to detect a filling state of photo-setting resin into the mold 10. In this embodiment, the detecting portion 38 detects the position of the screw or plunger 37. A result of detection performed by the detecting portion 38 is output to the light source unit 26. Emission state of the light source unit 26 is controlled on the basis of the detection result input from the detecting portion 38.

More specifically, in the mold 10 according to the third embodiment, the cavity 16 has a sufficiently thin shape in the central portion close to the outlet of the runner 18. Therefore, in the case where the light source unit 26 uniformly emits light when photo-setting resin is injected from the runner 18 into the cavity 16, the photo-setting resin is set in the central portion of the cavity 16 at the beginning, and photo-setting resin may not be sufficiently filled into the peripheral portion of the cavity 16.

To prevent the above problem, the emission state of the light source unit 26 is controlled. Specifically, as illustrated in an arrow E in FIG. 3, photo-setting resin is supplied to the screw or plunger 37, and injected into the cavity 16 by the screw or plunger 37 through the runner 18. In this process, the position of the screw or plunger 37 detected by the detecting portion 38 is input to the light source unit 26. In response to movement of the screw or plunger 37 from the injection start position to the injection end position, the annular LED lines of the light source unit 26 are successively turned on from the outermost annular LED line to the innermost annular LED line.

Therefore, the injection molding apparatus according to this embodiment has the following effect.

In the injection molding apparatus according to this embodiment, the emission state of the light source unit 26 is controlled in accordance with the filling state of photo-setting resin into the mold 10. Thereby, the progress of setting of the photo-setting resin is controlled, and an optimum setting process can be performed.

In the third embodiment, although the detecting portion 38 detects the position of the screw or plunger 37, the filling state of photo-setting resin can be ascertained by detecting the time elapsed after the mold 10 is closed, or the pressure of the cavity 16.

Figure 5A:
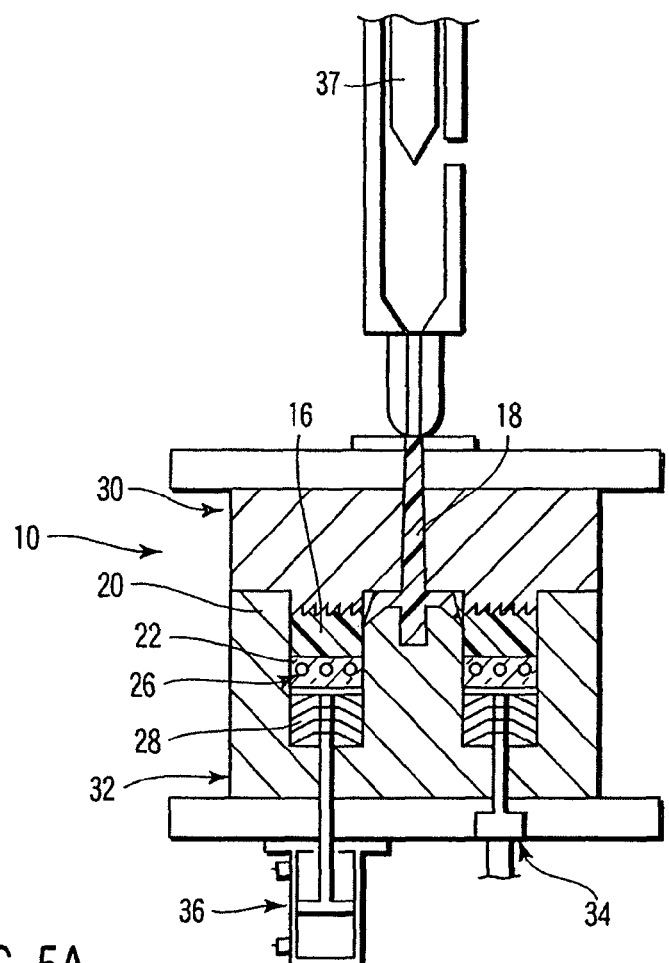
FIG. 5A is a longitudinal cross-sectional view showing an injection molding apparatus according to a fourth embodiment of the present invention, with the mold being closed.
Figure 5B:
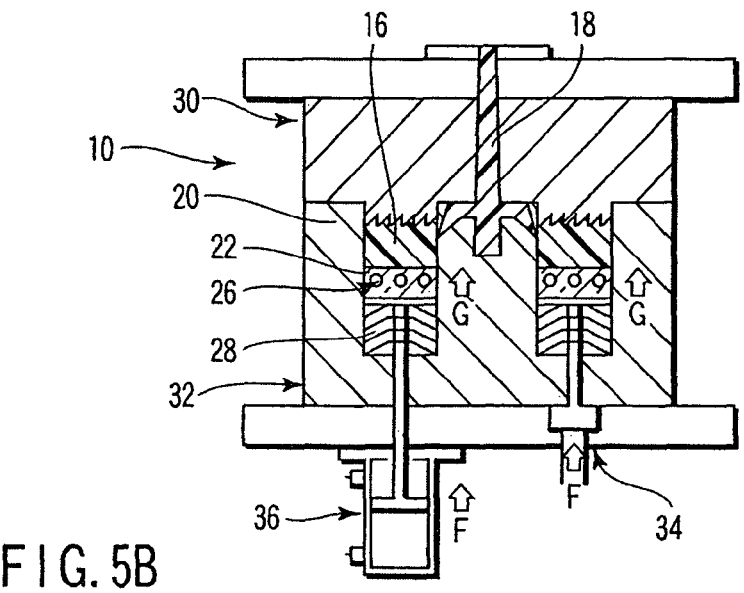
FIG. 5B is a longitudinal cross-sectional view showing the injection molding apparatus according to the fourth embodiment of the present invention, with the mold being compressed.

FIGS. 5A and 5B illustrate a fourth embodiment of the present invention. Constituent elements having the same functions as those in the third embodiment are denoted by the same respective reference numbers, and explanation thereof is omitted.

An injection molding apparatus according to the fourth embodiment is a vertical injection molding apparatus. The mold 10 of the injection molding apparatus is formed of an upper mold 30 and a lower mold 32 corresponding to the right mold and the left mold of the third embodiment, respectively. In the injection molding apparatus, two molded products are molded by one mold 10, and two cavities 16 are formed with the mold being closed. Further, the runner 18 extends from the upper mold 30 to the lower mold 32, and branches in the lower mold 32 to connect with the cavities 16 with the mold being closed. Further, corresponding to each cavity 16, the light-transmitting part 22 and the load deformation part 28 is provided, which are the same as those in the first embodiment.

In this embodiment, at least a portion of the mold 10 can be compressed by actuators 34 and 36 to increase the clamp force. Specifically, the light-transmitting part 22 can be compressed in a closing direction of the mold 10 by the actuators 34 and 36 provided in a die plate of the injection molding apparatus. Examples of the actuators 34 and 36 are an ejector pin 34, a hydraulic or pneumatic cylinder 36, an electric or hydraulic motor, and a spring. Further, magnetic force may be used for the actuators 34 and 36. A minute pattern is formed on the surface of each light-transmitting part 22 facing the cavity 16.

In the injection molding method according to this embodiment, when the upper mold 30 and the lower mold 32 are closed and clamped, the clamp force loaded on the light-transmitting parts 22 is relieved through compressive deformation of the load deformation part 28, in the same manner as the third embodiment. Further, when photo-setting resin is injected into the cavities 16 and set therein, the light-transmitting parts 22 are compressed in the closing direction of the mold 10 by the actuators 34 and 36, as illustrated in arrows F and G of FIG. 5B, and thereby the clamp force is increased. As a result, photo-setting resin sufficiently goes into the minute patterns on the surfaces of the light-transmitting parts 22, and high transfer performance is secured. Compression of the light-transmitting parts 22 by the actuators is limited to an extent not damaging the light-transmitting parts 22 due to increase of the clamp force.

Therefore, the mold 10 for the injection molding apparatus according to this embodiment has the following effect.

In the mold 10 for the injection molding apparatus according to this embodiment, the light-transmitting parts 22 including minute patterns are compressed and thereby the clamp force is Increased. Therefore, high transfer performance is secured for minute patterns.

In this embodiment, although the light-transmitting parts 22 are compressed in the injection step and the setting step of photo-setting resin, the light-transmitting parts 22 may be compressed in one of the injection step and the setting step. Further, a portion of the mold 10 other than the light-transmitting parts 22 or the whole mold 10 may be compressed. Furthermore, the clamping mechanism itself of the mold 10 may be used as the actuators.

Figure 6:
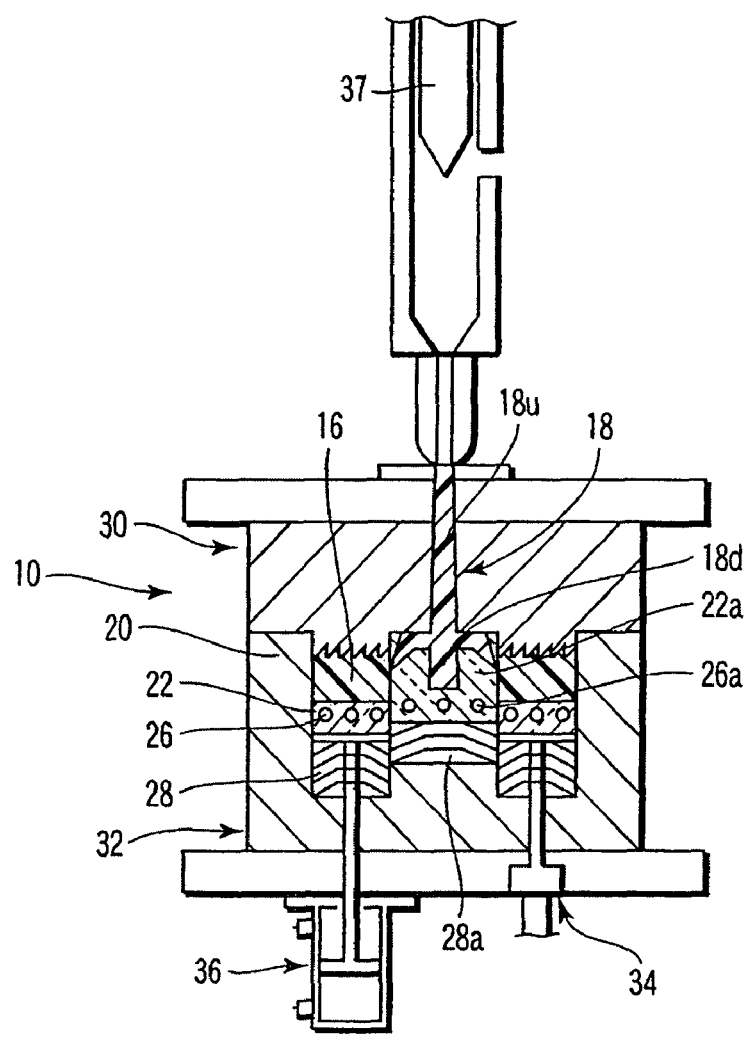
FIG. 6 is a longitudinal cross-sectional view showing an injection molding apparatus according to a fifth embodiment of the present invention, with the mold being closed.
Figure 7:
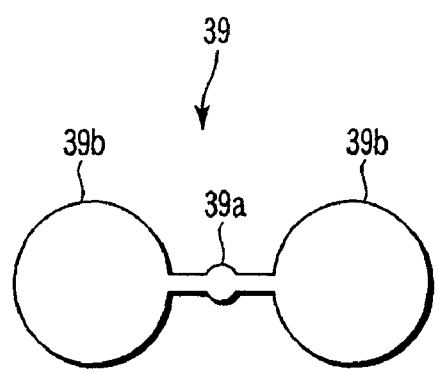
FIG. 7 is a top view showing a molded product molded by the injection molding apparatus according to the fifth embodiment of the present invention.

FIGS. 6 and 7 illustrate a fifth embodiment of the present invention. Constituent elements having the same functions as those in the fourth embodiment are denoted by the same respective reference numbers, and explanation thereof is omitted.

The lower mold 32 of the mold 10 for the injection molding apparatus according to the fifth embodiment includes a runner light-transmitting part 22a for setting photo-setting resin in the runner 18, in addition to the cavity light-transmitting parts 22 used for setting photo-setting resin in the cavities 16. Specifically, with the mold being closed, an upper runner 18u of the upper mold 30 is connected to a lower runner 18d formed to the runner light-transmitting part 22a of the lower mold 32, and the lower runner 18d is connected to each of the cavities 16. Further, the light source unit 26a is incorporated in the runner light-transmitting part 22a and the load deformation part 28a is provided together with the runner light-transmitting part 22a.

In the injection molding method according to this embodiment, after photo-setting resin is injected into the cavities 16 through the runner 18, the photo-setting resin in the cavities 16 are set by means of the cavity light-transmitting parts 22, and the photo-setting resin in the runner 18 is set by means of the runner light-transmitting part 22a.

Therefore, the mold 10 for the injection molding apparatus according to this embodiment has the following effect.

In the mold 10 for the injection molding apparatus according to this embodiment, photo-setting resin in the runner 18 can be set, unlike the mold 10 according to the fourth embodiment. Thus, it is unnecessary to perform a step of removing photo-setting resin in the runner 18, which has not set.

In actual use, the runner 18 is sufficiently smaller than the cavities 16 in the mold 10, and a runner portion 39a is sufficiently smaller than product portions 39b in a molded product 39, as illustrated in FIG. 7. Therefore, setting photo-setting resin in the runner 18 has little influence on the molding step and molded products.

Figure 8:
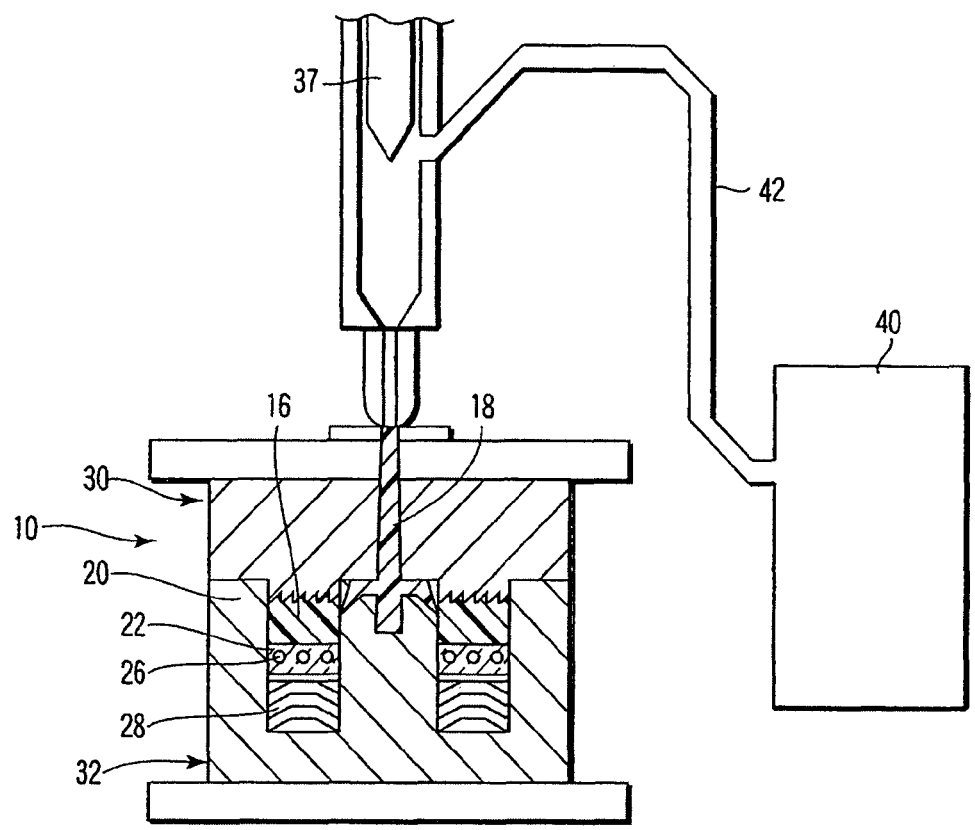
FIG. 8 is a longitudinal cross-sectional view showing a vertical injection molding apparatus according to a sixth embodiment of the present invention.
Figure 9:
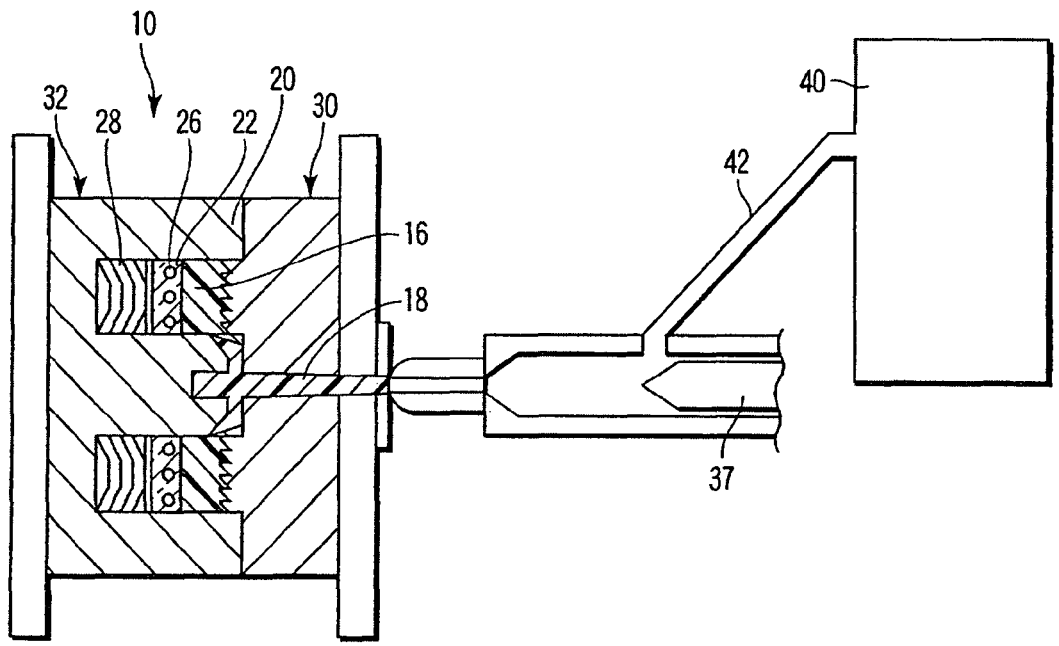
FIG. 9 is a longitudinal cross-sectional view showing a horizontal injection molding apparatus according to the sixth embodiment of the present invention.

FIGS. 8 and 9 illustrate a sixth embodiment of the present invention. Constituent elements having the same functions as those in the first embodiment are denoted by the same respective reference numbers, and explanation thereof is omitted.

FIG. 8 illustrates a vertical injection molding apparatus, and FIG. 9 illustrates a horizontal injection molding apparatus. The injection molding apparatus according to this embodiment includes a dispenser 40 to supply photo-setting resin to the screw or plunger 37, and the dispenser 40 is connected to the screw or plunger 37 through a channel portion 42. The dispenser 40 and the channel portion 40 are sealed. The pressure in the sealed space is controllable, and maintained at appropriate pressure under which photo-setting resin is stably supplied. A drive source using electric power, hydraulic power, pneumatic power, magnetic power, or a combination thereof is used as a drive source to supply photo-setting resin.

Therefore, the injection molding apparatus according to this embodiment has the following effect.

In the injection molding apparatus according to this embodiment, the dispenser 40 and the channel portion 42 are sealed, and photo-setting resin is supplied from the dispenser 40 to the screw or plunger 37 through the channel portion 42. Therefore, when photo-setting resin having a low viscosity or volatility is used, it is possible to prevent leakage and volatilization of the photo-setting resin, unlike an injection molding apparatus using a common dispenser 40 such as a hopper.

Also in the third to sixth embodiments, the light source unit 26 may be incorporated in the mold 10 as a member separate from the light-transmitting part 22, as in the second embodiment.

Although the light source unit 26 is incorporated in the mold 10 in the above embodiments, it is also possible to provide the light source unit 26 outside the mold 10, if the manufacturing cost is increased due to the incorporation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mold for an injection molding apparatus, comprising:
   a first mold half and a second mold half configured to be opened or closed in an opening or closing direction relative to each other and configured to form a cavity to be filled with photo-setting resin when the first mold half and the second mold half are closed, and
   wherein the first mold half includes:
      a light source configured to emit light,
      a first member configured to transmit the light emitted by the light source to the cavity;
      a second member configured to reinforce the first mold half and including a surface which faces the second mold half and a depressed portion which is formed in the surface, wherein the first member is provided within the depressed portion and movable relative to the second member along the opening or closing direction; and
      a third member disposed between the first member and a bottom portion of the depressed portion of the second member, arranged on a side in the opening direction of the first mold half relative to the first member and on a side in the closing direction of the first mold half relative to the second member, and configured to support the first member to relieve through compressive deformation a clamp force loaded on the first member from the second mold half when the mold is closed;
   the mold further comprising an actuator provided in a die plate of the first mold half that is configured to compress the first member relative to the second member to increase a clamp force.

2. An injection molding apparatus comprising:
   An injection molding apparatus comprising:
      a mold
      a screw or a plunger to inject photo-setting resin into the mold; and
      a dispenser to supply the photo-setting resin to the screw or the plunger,
      wherein the mold includes:
      a first mold half and a second mold half configured to be opened or closed in an opening or closing direction relative to each other and configured to form a cavity to be filled with the photo-setting resin when the first mold half and the second mold half are closed, and
      wherein the first mold half includes:
         a light source configured to emit light;
         a first member configured to transmit the light emitted by the light source to the cavity;
         a second member configured to reinforce the first mold half and including a surface which faces the second mold half and a depressed portion which is formed in the surface, wherein the first member is provided within the depressed portion and movable relative to the second member along the opening or closing direction; and
         a third member disposed between the first member and a bottom portion of the depressed portion of the second member, arranged on a side in the opening direction of the first mold half relative to the first member and on a side in the closing direction of the first mold half relative to the second member, and configured to support the first member to relieve through compressive deformation a clamp force loaded on the first member from the second mold half when the mold is closed;
      the injection molding apparatus further comprising an actuator provided in a die plate of the injection molding apparatus that is configured to compress the first member relative to the second member to increase a clamp force.

3. The injection molding apparatus according to claim 2, further comprising a detector configured to detect a filling state of the photo-setting resin into the mold, and wherein the light source is controlled in accordance with the filling state of the photo-setting resin detected by the detector.

4. The injection molding apparatus according to claim 3, wherein:
   the detector is configured to detect a position of the screw or plunger, time elapsed after the mold is closed, or pressure of the cavity.

5. The injection molding apparatus according to claim 2, wherein
   the dispenser is sealed.

6. The injection molding apparatus according to claim 3, wherein:
   the mold includes a runner through which the photo-setting resin is to be injected into the cavity,
   the detector is configured to detect progress in an injection of the photo-setting resin into the cavity, and
   the light source is configured to emit light starting from a region of the cavity apart from the runner to a region of the cavity substantially close to the runner in response to the progress in the injection of the photo-setting resin detected by the detector.

* * * * *